(12) United States Patent
Bottomley et al.

(10) Patent No.: US 8,967,850 B2
(45) Date of Patent: Mar. 3, 2015

(54) MULTISCREW EXTRUDER DEVICE WITH HEAT EXCHANGE STRUCTURE

(75) Inventors: Alan Bottomley, Milan (IT); Stefano Testi, Milan (IT); Thomas Ponta, Milan (IT); Alessio Longoni, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1089 days.

(21) Appl. No.: 13/003,204

(22) PCT Filed: Jul. 8, 2008

(86) PCT No.: PCT/IT2008/000457
§ 371 (c)(1),
(2), (4) Date: Jan. 7, 2011

(87) PCT Pub. No.: WO2010/004595
PCT Pub. Date: Jan. 14, 2010

(65) Prior Publication Data
US 2011/0110178 A1    May 12, 2011

(51) Int. Cl.
*B29B 7/82* (2006.01)
*B29C 47/82* (2006.01)
*B29C 47/42* (2006.01)
*B29C 47/00* (2006.01)

(52) U.S. Cl.
CPC .............. *B29C 47/42* (2013.01); *B29C 47/82* (2013.01); *B29C 47/003* (2013.01)
USPC .............. 366/85; 366/145; 366/149

(58) Field of Classification Search
USPC .......... 366/144–149, 79–91; 425/204, 425/208–209
See application file for complete search history.

(56) References Cited

U.S. PATENT DOCUMENTS

| | | | | |
|---|---|---|---|---|
| 5,639,159 A | * | 6/1997 | Sato | 366/75 |
| 5,836,682 A | * | 11/1998 | Blach | 366/84 |
| 6,852,257 B2 | | 2/2005 | Eiva | |
| 8,827,538 B2 | * | 9/2014 | Padmanabhan | 366/79 |

(Continued)

FOREIGN PATENT DOCUMENTS

| | | |
|---|---|---|
| CN | 1416389 A | 5/2003 |
| CN | 201056049 Y | 5/2008 |
| WO | WO-02/44247 A2 | 6/2002 |

OTHER PUBLICATIONS

International Search Report from the European Patent Office for International Application No. PCT/IT2008/000457 (Mail date May 25, 2009).

(Continued)

*Primary Examiner* — Charles Cooley
(74) *Attorney, Agent, or Firm* — Finnegan, Henderson, Farabow, Garrett & Dunner, L.L.P.

(57) ABSTRACT

A multiscrew extruder device for production of elastomeric compounds is intended for manufacturing tires for vehicle wheels. The device includes a holding body; a mandrel inserted in the holding body extending along a longitudinal axis and delimiting an annular chamber with the holding body; and a plurality of extrusion screws disposed in the annular chamber and parallel to the longitudinal axis. A first circuit for a heat-exchange fluid for temperature control is formed in the mandrel and includes a central channel extending in the mandrel along the longitudinal axis and a plurality of parallel peripheral channels extending in a peripheral portion of the mandrel close to the annular chamber and in fluid communication with the central channel.

74 Claims, 8 Drawing Sheets

(56) References Cited

U.S. PATENT DOCUMENTS

| | | |
|---|---|---|
| 2004/0094862 A1* | 5/2004 | Sturm et al. .................. 264/211 |
| 2006/0140048 A1 | 6/2006 | Ulzheimer et al. |
| 2007/0121421 A1 | 5/2007 | Blach |
| 2010/0067320 A1* | 3/2010 | Blach et al. .................... 366/85 |
| 2011/0110178 A1* | 5/2011 | Bottomley et al. ............. 366/86 |

OTHER PUBLICATIONS

Office Action issued by the State Intellectual Property Office of the People's Republic of China in corresponding Chinese Application No. 200880130252.9, dated Nov. 2, 2012, 15 pages.

* cited by examiner

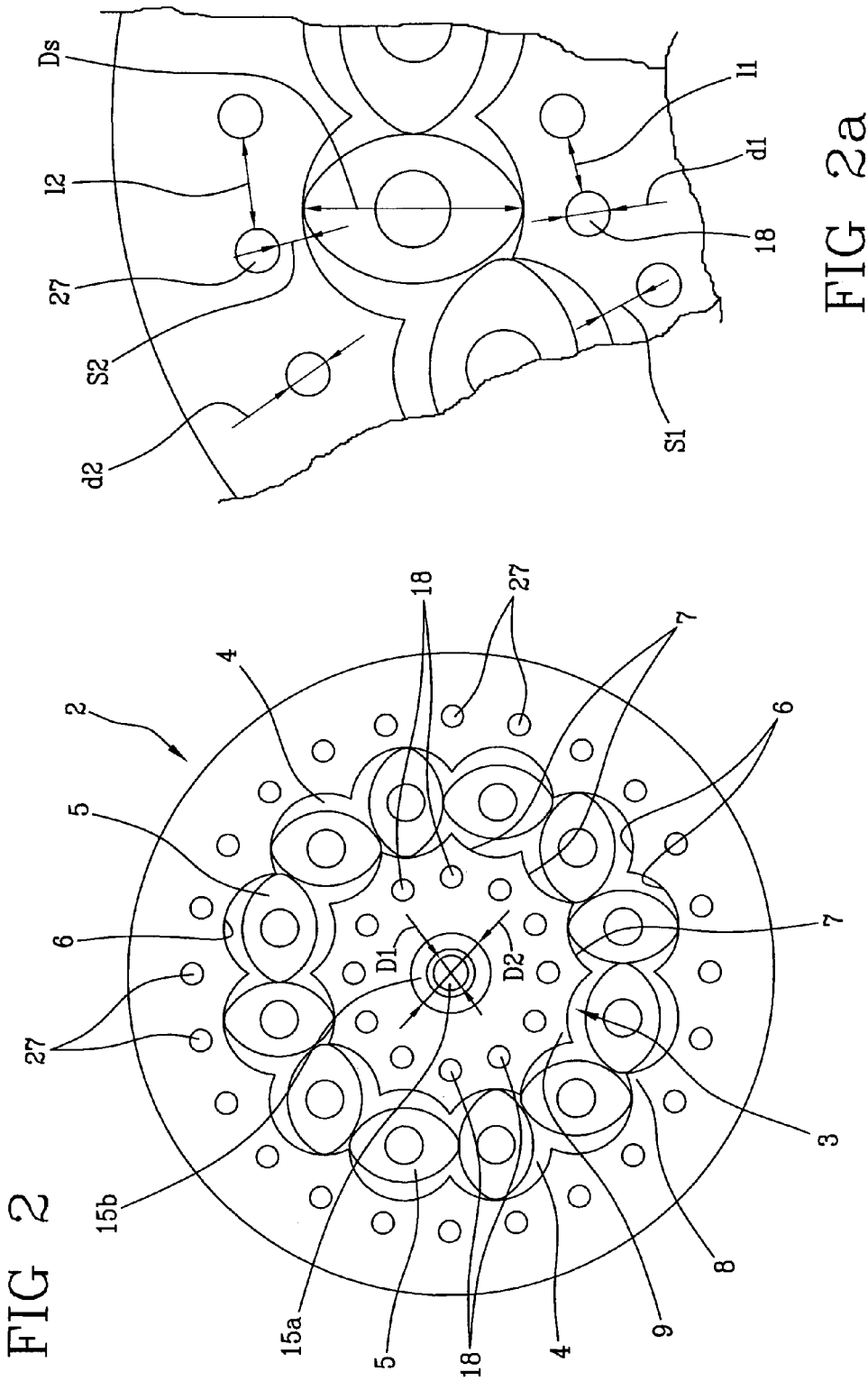

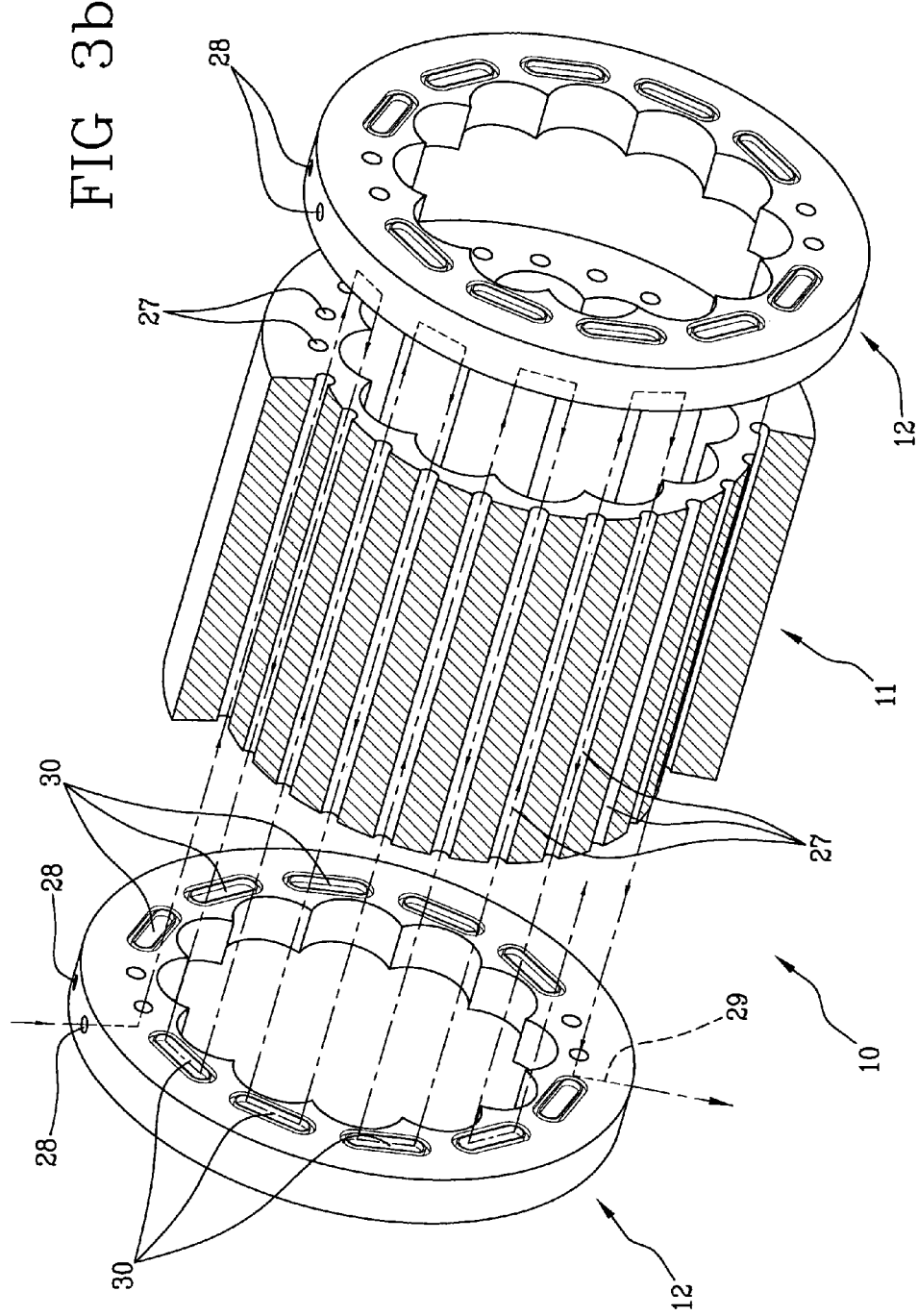

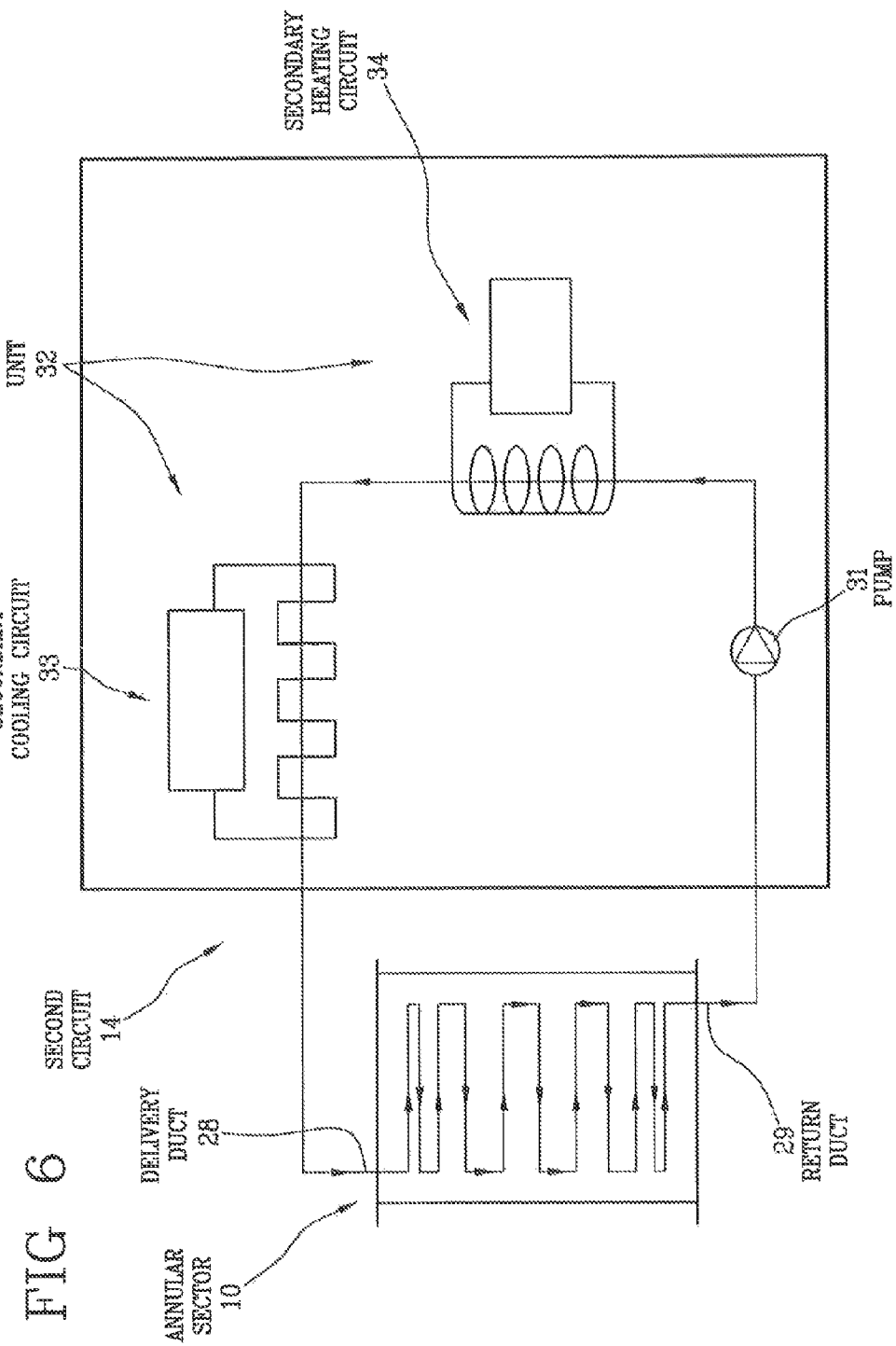

MULTISCREW EXTRUDER DEVICE WITH HEAT EXCHANGE STRUCTURE

CROSS REFERENCE TO RELATED APPLICATION

This application is a national phase application based on PCT/IT2008/000457, filed Jul. 8, 2008, the content of which is incorporated herein by reference.

BACKGROUND OF THE INVENTION

1. Field of the Invention

The present invention relates to a multiscrew extruder device for production of elastomeric compounds.

In particular, the invention pertains to a multiscrew extruder device for production of elastomeric compounds intended for manufacturing tyres for vehicle wheels.

2. Description of the Related Art

A tyre for vehicle wheels generally comprises a carcass structure including at least one carcass ply having respectively opposite end flaps in engagement with respective annular anchoring structures, integrated into the regions usually identified as "beads".

Associated with the carcass structure is a belt structure comprising one or more belt layers, disposed in radially superposed relationship with respect to each other and to the carcass ply and having textile or metallic reinforcing cords with a crossed orientation and/or substantially parallel to the circumferential extension direction of the tyre.

A tread band of an elastomeric compound, like other semifinished products of the tyre, is applied to the belt structure, at a radially external position. The tread band can be produced by extrusion. Through extrusion a semifinished product is obtained which is defined by a band or strip having a predetermined profile in cross-section, said band being devoid of the tread pattern and being cut to size based on the sizes of the tyre to be made.

Respective sidewalls of an elastomeric compound are also applied, at an axially external position, to the side surfaces of the carcass structure, each extending from one of the side edges of the tread band until close to the respective annular anchoring structure to the beads, which sidewalls too can be manufactured beforehand in the form of extruded or drawn section members.

Subsequent to building of the green tyre carried out through assembly of respective semifinished products, a vulcanisation and moulding treatment is generally carried out which aims at determining structural stabilisation of the tyre through cross-linking of the elastomeric compounds and at impressing the tread band wound around the carcass before vulcanisation with a desired thread pattern, and the sidewalls with possible distinctive graphic marks.

Preparation of the elastomeric compounds required for manufacture of the above mentioned components is known to take place by means of continuous-working extruders.

For instance, document US 2004/0094862 A1 discloses a multishaft extruder adapted to prepare an elastomer containing a filler and further additives. The extruder comprises the following regions: a feeding region at which the elastomer and additives are measured, a plasticization region provided with at least one element suitable for mixing, where the elastomer and additives are transformed into a mixture, a region provided with another element suitable for mixing, in which the filler is ground and distributed in the elastomer. The extruder comprises an outer housing accommodating an inner core and between which a chamber is defined which houses extrusion screws. The extruder has a cooling system for the inner core and a cooling system for the outer housing.

Document US 2007/0121421 A1 disclosed a multishaft extruder comprising a housing and an axial core. Defined between the housing and axial core is a circular chamber housing a plurality of parallel shafts. The core has an axial hole and an outer spiral channel which are adapted to be passed through by a cooling liquid.

The housing comprises a plurality of annular segments provided with holes for a cooling liquid. Each of the segments further has electric heating means disposed on an outer circumference thereof.

SUMMARY OF THE INVENTION

The Applicant has tackled the problem of obtaining compounds of high quality, while at the same time reaching a high productivity.

The Applicant has noticed that, in the production of elastomeric compounds using continuous-working extruders, an increase in the productivity can be achieved by adopting multishaft (or multiscrew) extruders of big sizes.

The Applicant has however seen that the elastomeric compounds are thermosensitive and are subjected to scorching and to dangerous and unwanted vulcanisation processes if during working they are brought, even locally, beyond a limit temperature which, depending on the type of process; can be included between about 90° C. and 150° C.

In addition, the Applicant has noticed that the extruders heat exchange capability decreases on increasing of the sizes of said extruders, because the increase in the heat exchange surface is smaller than the increase in the volume capacity of the extruders themselves. Big extruders therefore have more problems connected with temperature control of the compound contained inside them.

The Applicant therefore has tackled the problem of making temperature control of the compound inside multiscrew extruders more efficient, in particular as far as multiscrew extruders of big sizes are concerned, by optimising heat exchange between the compound and the elements composing the extruders. In particular, the Applicant has faced the problem of controlling temperature distribution in the compound over time and in the space internally of the multiscrew extruder.

The Applicant has found that, if at a radially external portion of a central mandrel in a multiscrew extruder formation of a plurality of channels parallel to each other and in fluid communication with a central channel extending along the longitudinal axis of said mandrel is provided, it is possible to obtain a very efficient circuit for temperature control of the elastomeric compound.

More specifically, in a first aspect, the present invention relates to a multiscrew extruder device for the production of elastomeric compounds comprising:
  a holding body;
  a mandrel inserted in the holding body and extending along a longitudinal axis; said mandrel and holding body delimiting an annular chamber therebetween;
  a plurality of extrusion screws disposed in the annular chamber and parallel to said longitudinal axis;
  at least one first circuit for a heat-exchange fluid for temperature control inside said annular chamber, said first circuit being formed in the mandrel;
wherein said first circuit comprises:
  a central channel extending within the mandrel along the longitudinal axis;

a plurality of parallel peripheral channels extending in a peripheral portion of the mandrel close to the annular chamber and in fluid communication with the central channel.

The Applicant has found that by providing a plurality of channels in the vicinity of the annular chamber and close to each other, the thermal resistance of the mandrel and thermal resistance of the "annular chamber-mandrel" interface can be reduced, i.e. it is possible to maximise the heat exchange between the compound-containing annular chamber and the mandrel itself. In addition, the central channel is able to bring the heat-exchange fluid to the peripheral channels and distribute it therein while maintaining pressure drops to a low degree and ensuring high efficiency of the first circuit. In addition, through adoption of the central channel, external connections for delivery and return of the heat-exchange fluid can be simplified.

The present invention, in at least one of said aspects, can have one or more of the preferred features hereinafter described.

Preferably, the peripheral channels of the first circuit are parallel to the longitudinal axis.

In addition, preferably, the peripheral channels of the first circuit are holes formed in the mandrel.

Accomplishment of channels parallel to the axis through formation of holes is quick and simple and allows costs and time for manufacturing the circuit to be reduced.

According to a preferred embodiment, each of the peripheral channels of the first circuit has a section diameter included between about 0.05 times and about 0.4 times the maximum diameter of an extrusion screw.

Each of the extrusion screws has a maximum diameter included between about 30 mm and about 150 mm.

Channels of such sizes are small enough to ensure high speed to the fluid flowing inside them, so as to maximise heat exchange and at the same time big enough not, to cause an excessive pressure drop inside the cooling circuit.

In addition, each of the peripheral channels of the first circuit has a minimum distance from the annular chamber greater than or equal to about 5 mm.

Furthermore, preferably, each of the peripheral channels of the first circuit has a minimum distance from the adjacent peripheral channel greater than or equal to about 5 mm.

The distance of the holes from each other and from the annular chamber, i.e. from the radially external surface of the mandrel, is such that heat exchange is maximised without any risk of impairing the structural integrity of the mandrel itself.

Preferably, one end of at least one of the peripheral channels of the first circuit is in fluid communication with one end of another peripheral channel.

In addition, one end of at least one of the peripheral channels of the first circuit is in fluid communication with the central channel.

The modes of connecting the peripheral channels with each other and with the central channel allow the first circuit to be made in the most convenient manner for the specific requirements.

According to a preferred embodiment, both opposite ends of each of the peripheral channels are in fluid communication with the central channel.

According to this solution, each of the peripheral channels is connected to the central channel in a manner independent of the others. In this way pressure drop due to passage of the heat-exchange fluid through the peripheral channel of reduced section is minimised, the passage speed is maximised and also maximised is heat exchange between the fluid itself and the respective mandrel portion.

According to a further preferred embodiment, the peripheral channels of the first circuit are organised into groups connected in parallel. The peripheral channels of each group are mutually connected in series. The first circuit has a delivery duct that can connect the central channel to one end of the first peripheral channel of each group and a return duct connecting one end of the last, peripheral channel of each group to the central channel.

Preferably, the peripheral channels of each group are adjacent.

Along the circumferential extension of the mandrel, the first circuit therefore defines serpentine-shaped portions of reduced length limiting pressure drop and keeping an efficient heat exchange, because at all events the fluid passing therethrough remains in the peripheral portion of the mandrel for a limited period of time. In addition, accomplishment of several groups with a limited number of delivery and return ducts allows the structural weakening of the mandrel due to removal of material, as required for making the first circuit, to be restricted.

Alternatively, the peripheral channels of the first circuit are mutually connected in series; the first circuit having a delivery duct connecting the central channel to one end of the first peripheral channel and a return duct connecting one end of the last peripheral channel to the central channel.

Along the circumferential extension of the mandrel, the first circuit therefore defines a single serpentine-shaped portion. Preferably, at least some of the peripheral channels have different lengths.

According to a preferred embodiment, the first circuit has delivery ducts and return ducts connecting the peripheral channels to the central channel; at least some of said delivery ducts being disposed at different points along the longitudinal axis.

In addition, preferably, the first circuit has delivery ducts and return ducts connecting the peripheral channels to the central channel; at least some of said return ducts being disposed at different points along the longitudinal axis.

Through distribution of the delivery and return ducts at different points and the diversified length of the peripheral channels, a differentiated heat exchange can be obtained based on the work regions of the extruder. For instance, the delivery ducts of the still cold fluid can advantageously be disposed in the regions of strong mixing where, due to the high viscosity of the elastomeric materials, a great amount of heat is generated. In the transport regions, where filling of the annular chamber is in addition low, about 30%, less peripheral channels can be arranged and/or it is possible to place the return ducts through which there is passage of the fluid that has already absorbed most of the generated heat.

In accordance with a preferred embodiment, the central channel comprises a radially internal portion in fluid communication through the delivery ducts with the peripheral channels, and a radially external portion in fluid communication through the return ducts with said peripheral channels.

This configuration allows the bulkiness of the first circuit inside the mandrel to be reduced.

Preferably, the radially external portion of the central channel has a section diameter included between about 0.5 times and about 1.2 times the maximum diameter of an extrusion screw.

In addition, the radially internal portion of the central channel has a section diameter included between about 0.35 times and about 0.85 times the maximum diameter of an extrusion screw.

These passage sections for delivery and return of the fluid are capable of maintaining a low pressure drop of the fluid in the central region of the mandrel where heat exchange is of little importance.

In a preferred embodiment, the device comprises at least one second circuit for temperature control formed in the holding body.

Temperature adjustment therefore takes place both through the radially internal wall and the radially external wall of the annular chamber.

Preferably, the device comprises a plurality of second circuits for temperature control that are independent and axially aligned along the longitudinal axis.

The presence of several independent second circuits enables the efficiency of each of them to be increased and the temperature of each region of the annular chamber to be adjusted irrespective of the others.

According to an embodiment, the holding body comprises a plurality of sectors that are axially aligned, along said longitudinal axis; each of said sectors having a second circuit for temperature control.

Division into several segments facilitate creation of the individual second circuits.

Preferably, the second circuit for temperature control has a plurality of peripheral channels that are parallel and extend in a portion of the holding body close to the annular chamber.

Preferably, in addition, the peripheral channels of the second circuit for temperature control are parallel to the longitudinal axis.

According to a preferred embodiment, each of the peripheral channels of the second circuit has a section diameter included between about 0.05 times and about 0.4 times the maximum diameter of an extrusion screw.

In the same manner as for the mandrel channels, these sizes ensure high speed to the fluid flowing inside said channels, so as to maximise heat exchange, and at the same time do not give rise to an excessive pressure drop in the second circuit/s for temperature control.

Preferably, each of the peripheral channels of the second circuit has a minimum distance from the annular chamber greater than or equal to about 5 mm.

In addition, each of the peripheral channels of the second circuit has a minimum distance from the adjacent peripheral channel greater than or equal to about 5 mm. The distance of the holes from each other and from the annular chamber, i.e. from the radially internal surface of the holding body, is such as to maximise heat exchange without the structural integrity of the holding body itself being impaired.

According to a preferred embodiment, the device comprises a thermoregulation unit coupled to the first circuit for temperature control.

In addition, preferably, the thermoregulation unit is external to the mandrel.

Most preferably, the device comprises a thermoregulation unit coupled to the second circuit for temperature control.

In addition, preferably, the device comprises a plurality of independent thermoregulation units, each of them being coupled to one of the second circuits for temperature control.

The thermoregulation unit is external to the holding body.

The thermoregulation unit acts on the fluid contained in the respective circuit that, in turn, exchanges heat with the mandrel's and/or holding body's sides put into contact with the compound.

By adopting thermoregulation units coupled to the first circuit and/or to the second circuit/circuits, the temperature of the heat-exchange fluid passing in said circuits can be adjusted in a very accurate manner and the set temperature of the inner walls of the annular chamber to be maintained substantially constant with a margin of few degrees (advantageously +/−5° C.). The thermoregulation units dedicated to each circuit of the holding body in addition allow the temperature of the elastomeric compound being treated to be adjusted region by region.

The presence of the first and second circuits passing through the mandrel and/or the holding body and inside which the heat-exchange fluid thermoregulated by external units flows, allows the structure of the holding body and that of the extruder's mandrel to be simplified.

Since temperature of the heat-exchange fluid is adjusted while the latter is flowing within the respective channels, valves or other arrangements for filling and/or emptying the circuits are not required to be adopted. As a result, the extruder is very reliable and temperature adjustment is more accurate. In fact, there are no transients and delays correlated with opening of the valves and subsequent filling/emptying of the ducts. In addition, due to the absence of valves, pressure drops in the cooling circuits can be further reduced.

Preferably, the thermoregulation unit comprises a secondary cooling circuit.

In addition, preferably, the thermoregulation unit comprises a secondary heating circuit.

In this way, the heat-exchange fluid can be cooled and/or heated based on the specific requirements. Furthermore, this configuration allows portions of the annular chamber to be heated without use of electric resistors installed close thereto. As a result, the structure of the device (mandrel and holding body) is simpler and heating takes place in a more uniform and controlled manner.

In accordance with an embodiment, the device further comprises bars to be inserted into the peripheral channels so as to reduce section of same. Said bars enable the passage section to be locally reduced and the speed of the heat-exchange fluid to be increased at those points where more heat exchange is required to be obtained.

According to an embodiment, in a mandrel cross section, the ratio between the sum of the area of the peripheral channels and the central channel and the section area of the mandrel is included between about 0.05 and about 0.7.

Further features and advantages will become more apparent from the detailed description of a preferred but not exclusive embodiment of a multiscrew extruder device for production of elastomeric compounds, in accordance with the present invention.

BRIEF DESCRIPTION OF THE DRAWINGS

This description will be set out hereinafter with reference to the accompanying drawings, given by way of non-limiting example, in which:

FIG. 2 is a cross section of the device in FIG. 1;

FIG. 2a shows a portion of FIG. 2 to an enlarged scale;

FIGS. 3a and 3b show respective exploded and partly split perspective views of a first element of the device in FIG. 1;

FIG. 6 shows a diagram of a temperature control circuit relating to the element in FIGS. 3a and 3b.

DETAILED DESCRIPTION OF THE INVENTION

Figure 1:
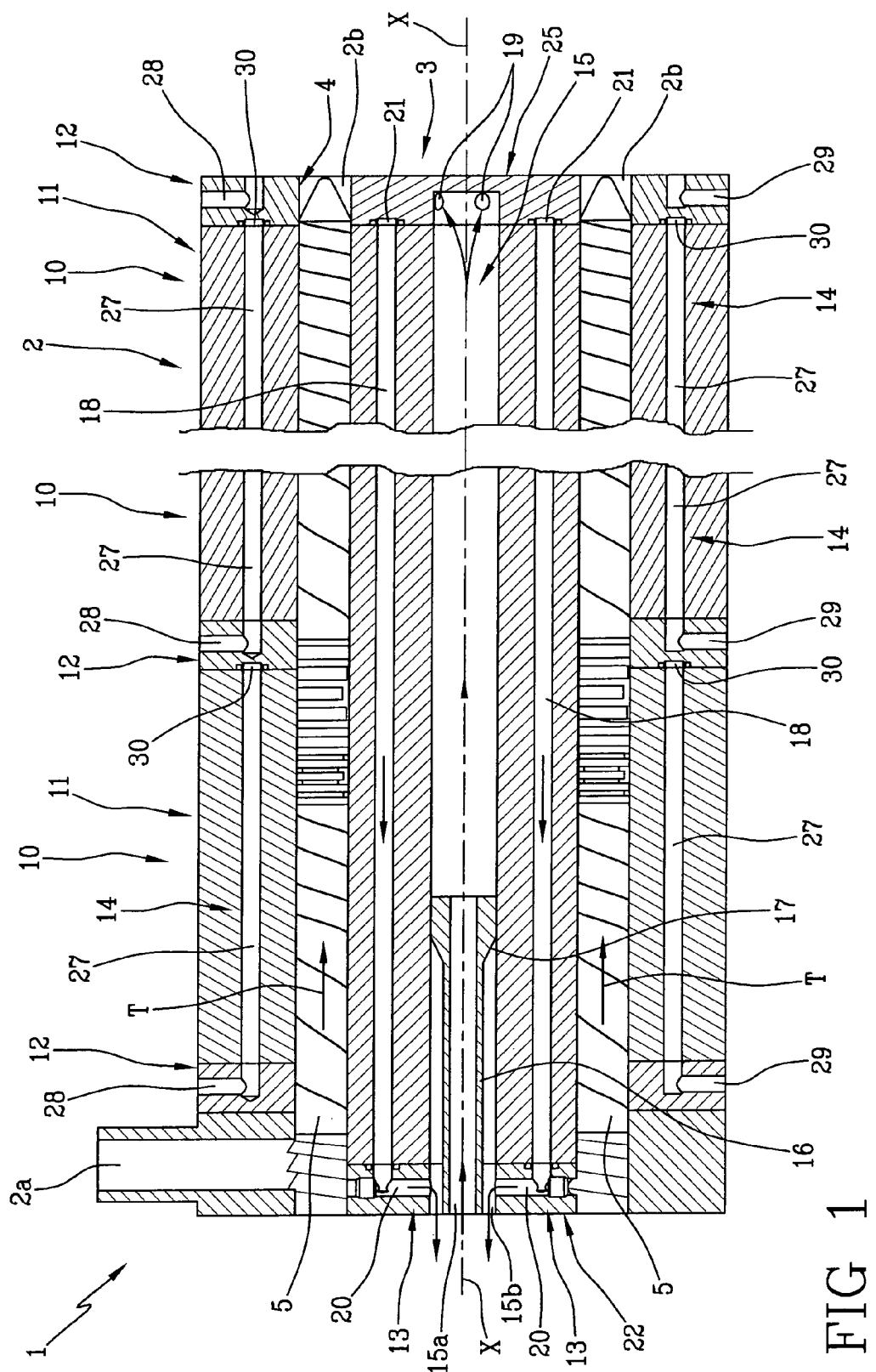
FIG. 1 shows a partial section in an axial plane of a multiscrew extruder device for production of elastomeric compounds according to the invention.

With reference to the drawings, a multiscrew extruder device for production of elastomeric compounds preferably used for manufacturing tyres for vehicle wheels has been generally denoted by reference numeral 1.

Device 1 comprises a substantially cylindrical holding body 2 mainly extending along a longitudinal direction and having a mandrel 3 at the inside of a chamber thereof.

An annular chamber 4 (FIG. 2) is delimited between a radially external surface of mandrel 3 and a radially internal surface of the holding body 2, said chamber 4 being partly coincident with the chamber of the holding body 2. Mandrel 3 extends along a longitudinal axis "X-X" and is coaxially mounted in a fixed manner in body 2.

The holding body 2 has at least one inlet opening 2a radially opening into a side wall thereof to enable introduction into the annular chamber 4 of the components of the compound to be produced. The holding body 2 further has a discharge opening 2b for the finished compound located to a distal end of the body 2 itself. In the embodiments shown in FIGS. 1 and 5, the discharge opening 2b corresponds to an open longitudinal end of the annular chamber 4.

Extrusion screws 5, preferably six or more in number (twelve in the embodiment shown), are disposed in the annular chamber 4, around mandrel 3 and parallel to the longitudinal axis "X-X". Screws 5 are penetrating and self-cleaning screws rotatably supported by body 2, and they substantially extend along the whole longitudinal extension of the annular chamber 4. Screws 5 are driven in rotation by a motor, not shown, and along their longitudinal extension have regions with different structural features to submit the compound to different process steps.

Screws 5 by their rotation cause the components of the compound to advance in a predetermined transport direction "T" and, at the same time, cause the same to be processed in such a manner as to produce the compound itself and give it the desired physicochemical features before said compound is emitted through the discharge opening 2b. For instance, along said transport direction "T" of the compound, the extruder device 1 has a material-feeding region, a mastication region, a mixing region and a region for transport towards said discharge opening 2b.

Irrespective of the specific succession of regions with different treatments, regions with strong mixing, transport regions and mixed regions are present.

In the regions of strong mixing the material is submitted to shearing and axial stresses with production of heat due to viscosity of the treated materials. In these regions filling of the annular chamber portion 4 is almost complete and the treated materials lie substantially in contact with the whole radially internal corresponding surface of the holding body 2 and the radially external corresponding surface of mandrel 3. In the transport regions, filling of the annular chamber 4 is included between about 20% and 50% and the materials are subjected to smaller deformations/stresses.

The holding body 2 at its radially internal surface has concavities 6 (FIG. 2) extending parallel to the longitudinal axis "X-X" and having a cross section in the form of an arc of a circle. Mandrel 3 at its radially external surface has corresponding concavities 7 (FIG. 2) extending parallel to the longitudinal axis "X-X" and having a cross section in the form of an arc of a circle. Screws 5 are housed in said concavities 6, 7.

Axial protrusions 8, 9 are defined between two adjacent concavities 6, 7 both of mandrel 3 and of the holding body 2, at which protrusions the treated material can move from one screw 5 to the adjacent one.

The maximum diameter "$D_s$" of screws 5 (FIG. 2a) is typically included between about 30 mm and about 150 mm. This maximum diameter "$D_s$" is typically the same for all screws 5 of a single extruder device 1 and can be substantially coincident with the diameter of concavities 6, 7.

The holding body 2 (FIGS. 1 and 5) has a tubular shape and is formed with a plurality of annular sectors 10 aligned along the longitudinal axis "X-X".

The ratio between the axial length of each of the annular sectors 10 and the maximum diameter "$D_s$" of screw 5 is preferably included between about 2 and about 10.

Figure 3A:
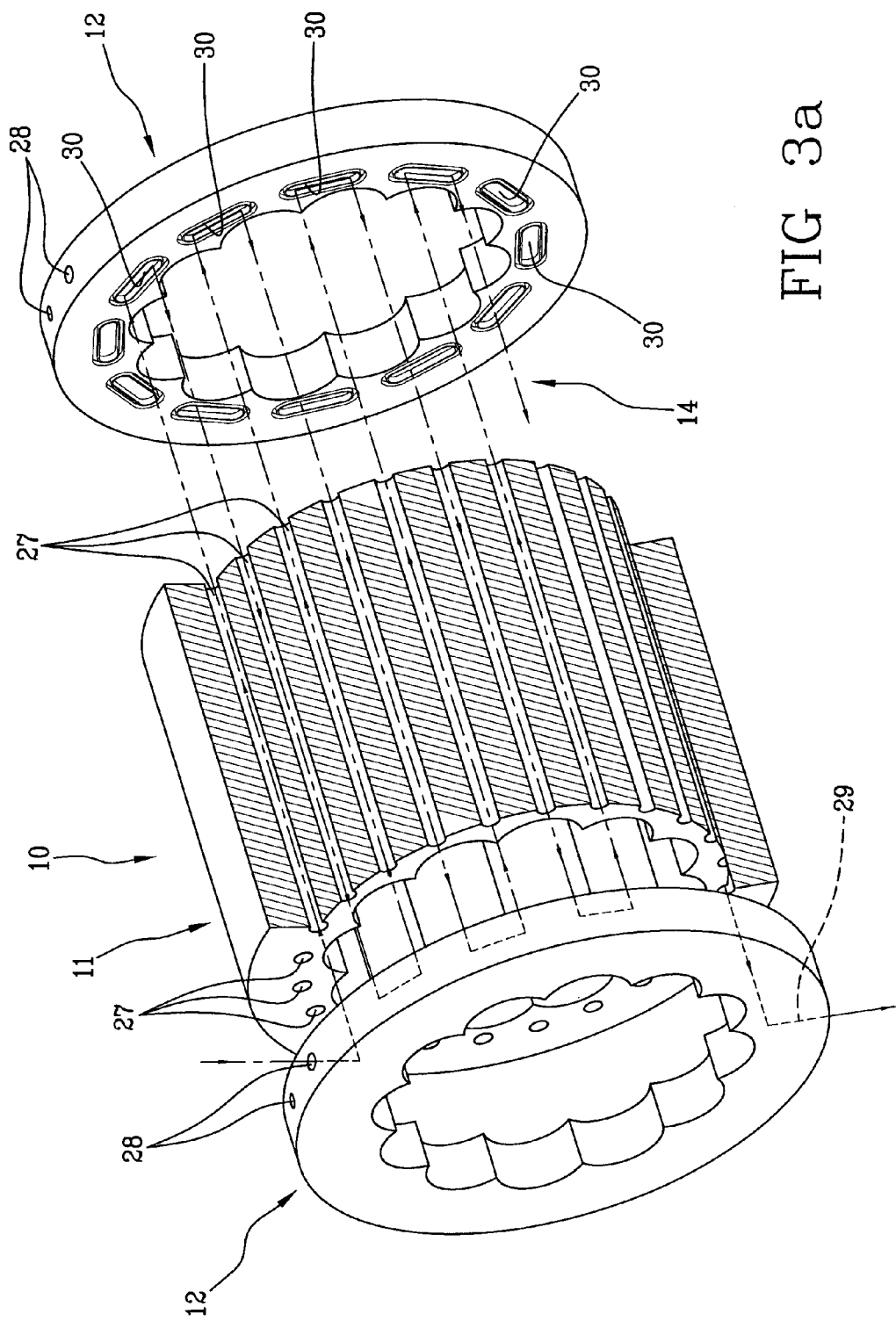

Each of the annular sectors 10 is formed with a central annular body 11 and a pair of annular end bodies 12 mounted to opposite longitudinal ends of the central annular body 11 (FIGS. 3a and 3b).

Figure 5:
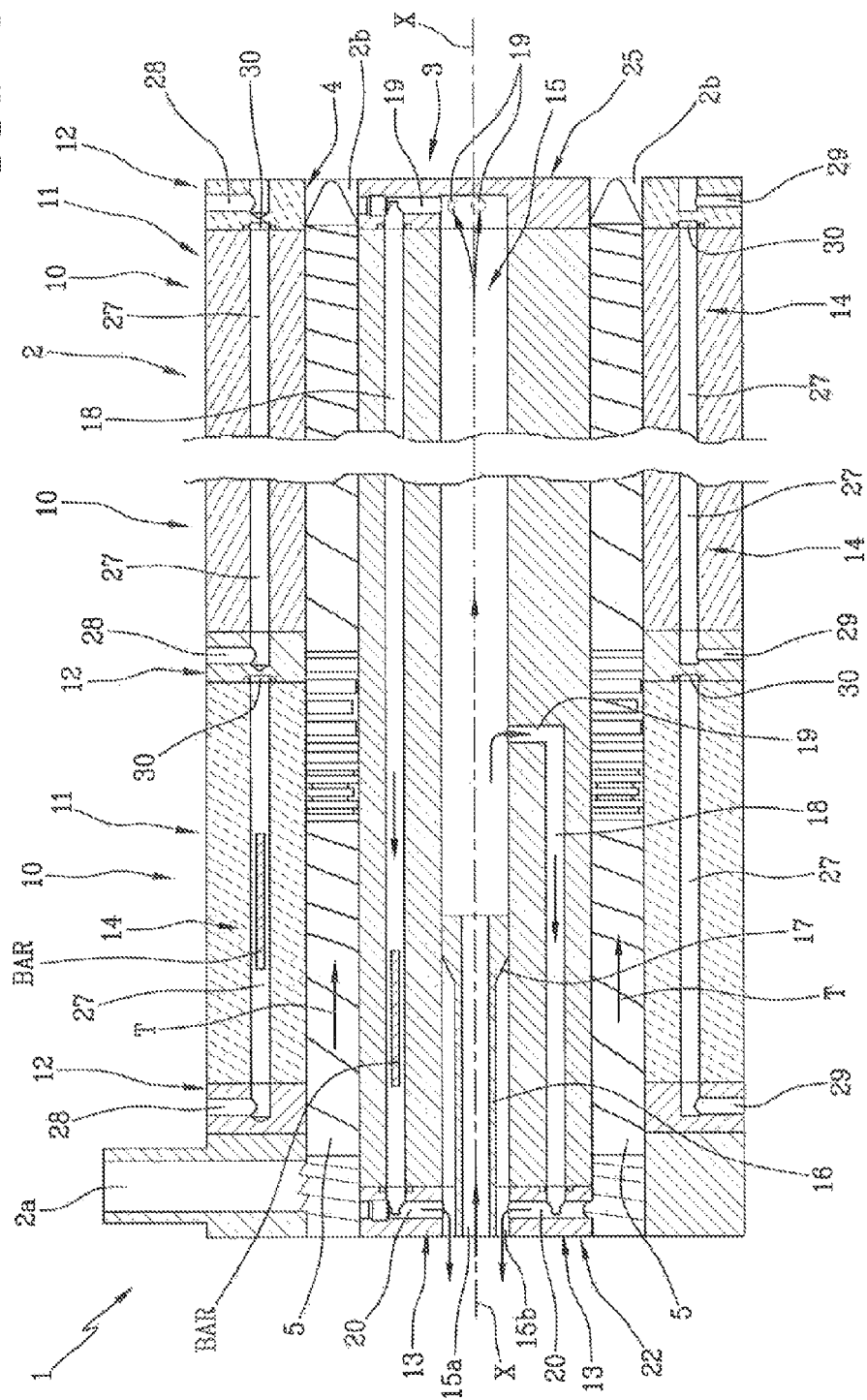
FIG. 5 shows a partial section taken in an axial plane of a variant of the device in FIG. 1.

The extruder device 1 further comprises a first circuit 13 for temperature control formed in mandrel 3, and a plurality of second circuits 14, preferably independent of each other, for temperature control formed in the holding body 2 (FIGS. 1 and 5).

The first circuit 13 has a central channel 15 of circular section, which extends in mandrel 3 substantially over the whole length of the annular chamber 4 and is coaxial with the longitudinal axis "X-X".

The central channel 15, at least over e length of its axial extension, is sealingly divided into two compartments by a cylindrical baffle 16 coaxial with the longitudinal axis "X-X", i.e. it has a radially internal portion 15a and a radially external portion 15b. The cylindrical baffle 16 is further supported inside the central channel 15 by a frustoconical body 17 having a minor circular edge closed on the cylindrical baffle 16 and a major circular edge in contact with a radially external surface of the central channel 15. In the embodiment shown in FIGS. 1 and 5, the cylindrical baffle 16 is disposed in a length of the central channel 15 opposite to the discharge opening 2b. The frustoconical body 17 forms a unitary piece with the cylindrical baffle 16 and divides channel 15 into a first length provided with the radially internal portion 15a and the radially external portion 15b and a second length delimiting a single volume and terminating with a distal blind end close to the discharge opening 2b.

The radially internal portion 15a of the central channel 15 has a section diameter "$D_1$" included between about 0.35 and about 0.85 times the maximum diameter "$D_s$". The radially external portion 15b of the central channel 15 has a section diameter "$D_2$" included between about 0.5 and about 1.2 times the maximum diameter "$D_s$" (FIG. 2).

The first circuit 13 further has a plurality of peripheral channels 18 parallel to each other and to the longitudinal axis "X-X". The peripheral channels 18 are defined by holes formed in a radially peripheral portion of mandrel 3, i.e. a portion close to the annular chamber 4. Preferably, these peripheral channels 18, as is apparent from the cross-section of mandrel 3 shown in FIG. 2, have their centres disposed on a circumference centred on said longitudinal axis "X-X" and are angularly spaced apart the same distance from each other.

Preferably, each of the peripheral channels 18 is radially aligned with a corresponding axial protrusion 9 of mandrel 3. The peripheral channels 18 shown have a circular shape but, according to alternative embodiments not shown, could also take other more complex shapes, an elliptical shape for example.

Each of the peripheral channels 18 of said first circuit 13 (FIG. 2) has a section diameter "$d_1$" included between about 0.05 times and about 0.4 times the maximum diameter "$D_s$", preferably included between about 0.15 times and about 0.3 times the maximum diameter "$D_s$", and a minimum distance "$l_1$" from the adjacent peripheral channel 18, i.e. the distance between the two side surfaces of the holes, greater than or equal to about 5 mm.

In a transverse section of mandrel 3, the ratio between the sum of the area of the peripheral channels 18 and the central channel 15 and the section area of mandrel 3 is included between about 0.05 and about 0.7.

In addition, the minimum distance "$s_1$" of each of the peripheral channels 18 of the annular chamber 4, i.e. the minimum distance between the side surface of hole 18 and the radially external surface of mandrel 3 measured along a direction orthogonal to said radially external surface, is equal to or greater than about 5 mm.

The length of mandrel 3 is included between about 10 and about 60 times the maximum diameter "$D_s$".

The peripheral channels 18 are in fluid communication with the central channel 15 through delivery ducts 19 and return ducts 20 (FIGS. 1, 5 and 4a, 4b).

The delivery ducts 19 extend in substantially radial directions and connect the radially internal portion 15a of the central channel 15 to the peripheral channels 18. The return ducts 20 too extend in substantially radial directions and connect the peripheral channels 18 to the radially external portion 15b.

A heat-exchange fluid, water for example, is admitted through the radially internal portion 15a, partly or fully passes through the central channel 15 and flows into the delivery ducts 19 until the peripheral channels 18. The fluid travels through the peripheral channels 18 and subsequently, through the return ducts 20, flows into the radially external portion 15b and comes out of mandrel 3.

In accordance with an alternative embodiment, not shown, the delivery ducts 19 connect the radially external portion 15b to the peripheral channels 18, and the return ducts 20 connect the peripheral channels 18 to the radially internal portion 15a. The heat-exchange fluid is admitted through the radially external portion 15b and flows into the delivery ducts 19 until the peripheral channels 18. The fluid travels through the peripheral channels 18 and subsequently, through the return ducts 20, flows into the radially internal potion 15a and comes out of mandrel 3.

Each of the peripheral channels 18 can have its opposite ends both connected to the central channel 15 through respective delivery 19 and return 20 ducts so as to form parallel paths for the fluid and thus obtain the maximum efficiency. Peripheral channels 18 of this type are depicted in the embodiment shown in FIG. 5.

Figure 4A:
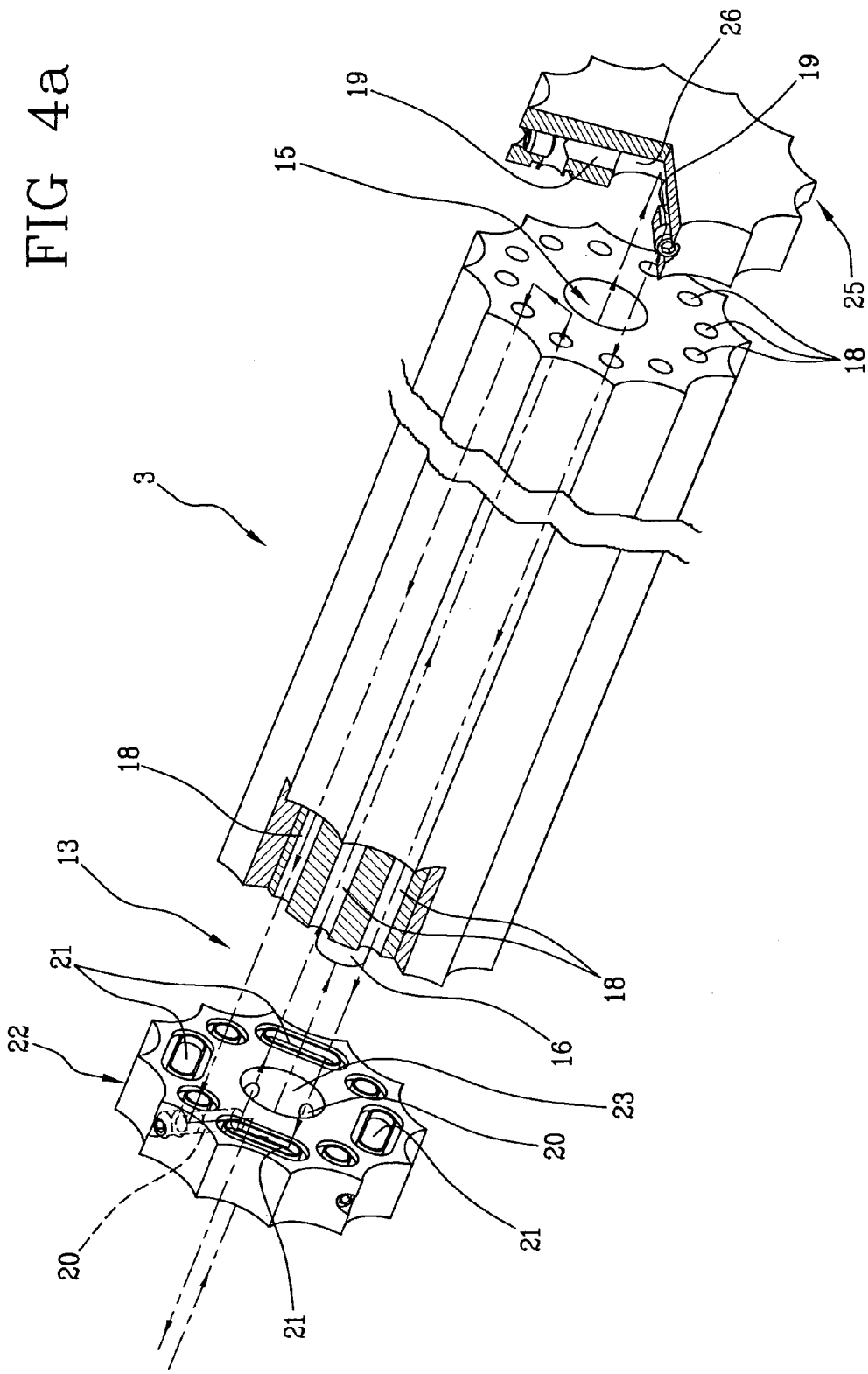
FIGS. 4a and 4b show respective exploded and partly split perspective views of a second element of the device in FIG. 1.
Figure 4B:
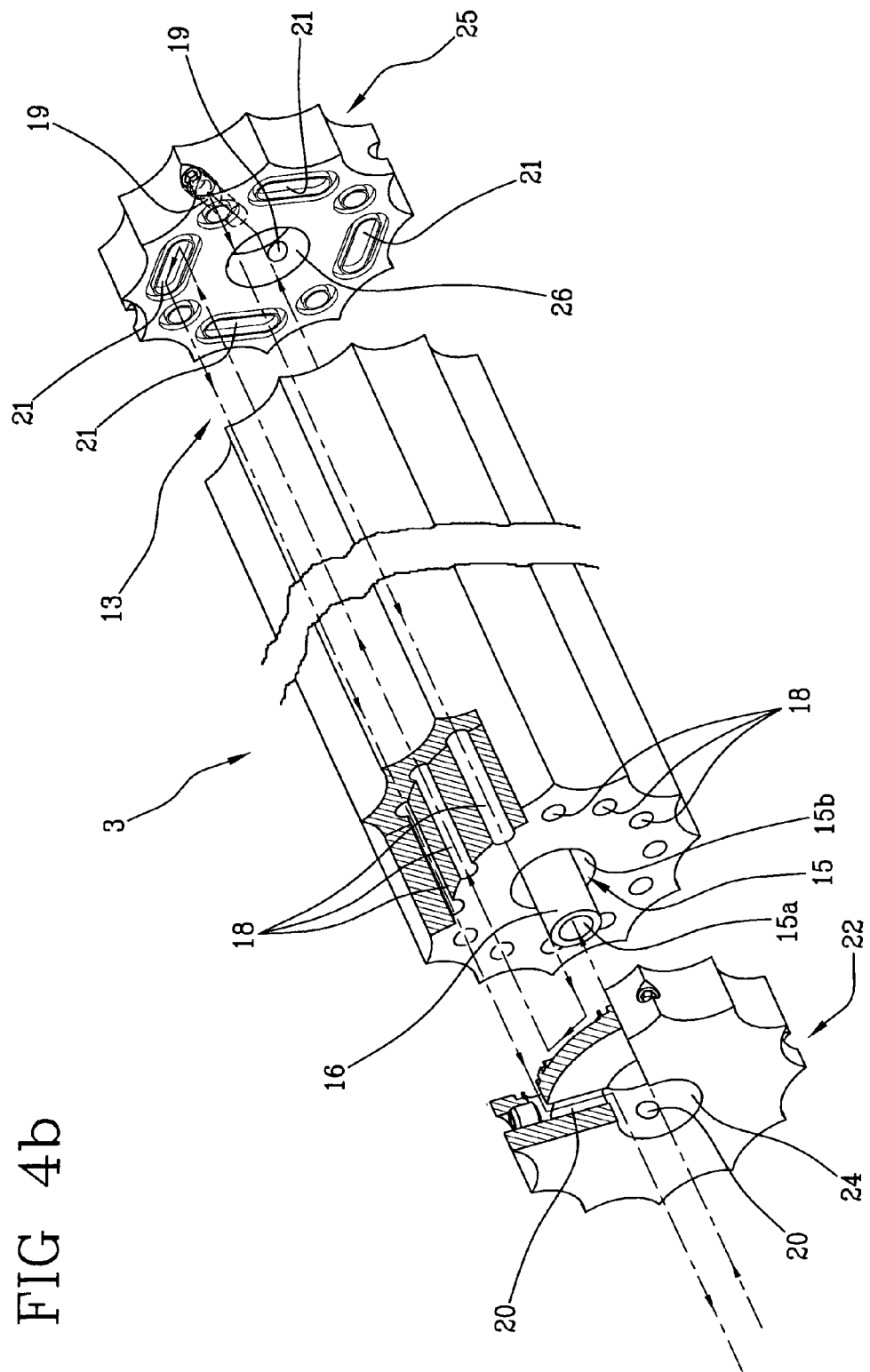

Preferably, as illustrated in FIGS. 4a and 4b, the peripheral channels 18 are organised into groups, and the peripheral channels 18, preferably the adjacent ones, of each group are mutually connected in series, which means that the connecting ducts 21 bring adjacent ends of two peripheral channels at a time into fluid communication, so as to form a serpentine-shaped path. The first peripheral channel 18 of the series is connected through a delivery duct 19 to the central channel 15 and the last peripheral channel 18 of the same series is connected though a return duct 20 to the central channel 15. Therefore, the different groups are connected in parallel to the central channel 15. FIGS. 4a and 4b show four groups, each formed of three peripheral channels 18 in series. In FIGS. 4a and 4b the full path of the fluid in one of said four groups is highlighted: a delivery duct 19 connects the central channel 15 to a first end of the first peripheral channel 18 of the series; a connecting duct 21 connects a second end opposite to the first one of the first peripheral channel 18 to a second end of a second peripheral channel 18, adjacent to the first one, of the series; a further connecting duct 21 connects a first end opposite to the second one of the second peripheral channel 18 to a first end of a third peripheral channel 18, adjacent to the first one, of the series; a return duct 20 connects a second end opposite to the first one of the third peripheral channel 18 of the series to the radially external portion 15b of the central channel 15.

In an alternative embodiment not shown, all peripheral channels 18 are mutually connected in a single series and mandrel 3 has a single delivery duct 19 and a single return duct 20.

The delivery 19 and return 20 ducts and possible connecting ducts 21 can be directly formed in the body of mandrel 3 or preferably in plates closing the longitudinal ends of said mandrel 3. In addition, according to a construction variant not shown, the mandrel body can be made up of several sectors disposed axially close to each other.

FIGS. 1, 5, 4a and 4b show a first plate 22 closing one end of mandrel 3 opposite to the discharge opening 2b. The first plate 22 has radial passageways defining the return ducts 20 which are in communication with a respective central space 23 defining a proximal end of the central channel 15. The first plate 22 further has tangential grooves on a face thereof coupled to the mandrel body, which grooves once the first plate 22 is coupled to the mandrel body, define the connecting ducts 21.

Formed in the bottom surface of space 23 is a through opening 24 through which the cylindrical baffle 16 passes. The end of the cylindrical baffle 16 passing through the first plate 22 is in fluid communication with the delivery of an outer part of the circuit to be described below. The radially external portion of the through opening 24 brings the radially external portion 15b of the central channel 15 into fluid communication with the return portion of said outer part of the circuit.

FIGS. 4a and 4b show a second plate 25 closing one end of mandrel 3 placed close to the discharge opening 2b. The second plate 25 has radial passages defining the delivery ducts 19 which are in communication with a respective central space 26 defining the distal blind end of the central channel 15. The second plate 25 further has tangential grooves in a face thereof coupled to the mandrel body, which grooves once the second plate 25 is coupled to the mandrel body, define the connecting ducts 21.

In accordance with alternative embodiments, the peripheral channels 18 have different lengths and can be positioned in different sections along the axial extension of mandrel 3. As a result, the delivery ducts 19 and/or the return ducts 20 are disposed at different points along the longitudinal axis "X-X" of mandrel 3. Alternatively, mandrel 3 is divided into two parts and the delivery ducts 19 of the shortest peripheral channels 18 are made in the form of grooves formed in the mutually approached faces of said two parts.

With reference to the holding body 2, each of the second circuits 14 located in each of the annular sectors 10 of the holding body 2 has a plurality of peripheral channels 27 parallel to each other and to the longitudinal axis "X-X".

The peripheral channels 27 are defined by holes formed in a radially internal portion of the holding body 2, i.e. close to the annular chamber 4. Preferably, these peripheral channels 27, as highlighted by the cross-section of the holding body 2 viewed in FIG. 2, have their centres disposed along a centred circumference on said longitudinal axis "X-X" and are angularly spaced apart the same distance from each other.

Preferably, each of the peripheral channels 27 that is radially in alignment with a corresponding axial protrusion 8 of the holding body 2 can be moved apart a greater distance towards the longitudinal axis "X-X" than the remaining channels 27.

Each of the peripheral channels 27 of the second circuit 14 has a section diameter "$d_2$" (FIG. 2a) included between about 0.05 times and about 0.4 times the maximum diameter "$D_s$", preferably included between about 0.15 times and about 0.3 times the maximum diameter "$D_2$" and a minimum distance "$l_2$" from the adjacent peripheral channel 27 greater than or equal to about 5 mm.

In addition, the minimum distance "$s_2$" of each of the peripheral channels 27 from the annular chamber 4, i.e. the minimum distance between the side surface of hole 27 and the radially internal surface of the holding body 2 measured along a direction perpendicular to said radially internal surface, is greater than 5 mm.

The peripheral channels 27 are in fluid communication with an outer portion of the second circuit 14, illustrated in the following, through delivery ducts 28 and return ducts 29 preferably extending in substantially radial directions.

As shown in FIGS. 3a and 3b, the peripheral channels 27 are organised into groups and the preferably adjacent peripheral channels 27 of each group are mutually connected in series, i.e. there are connecting ducts 30 bringing adjacent ends of two peripheral channels 27 at a time into fluid communication so as to form a serpentine-shaped path.

FIGS. 3a and 3b show two groups, each formed of twelve peripheral channels 27 in series. A delivery duct 28 connects the external circuit to a first end of the first peripheral channel 27 of the series; a connecting duct 30 connects a second end, opposite to the first one, of the first peripheral channel 27 to a second end of a second peripheral channel 27 of the series, adjacent to the first one; a further connecting duct 30 connects a first end, opposite to the second one, of the second peripheral channel 27 to a first end of a third peripheral channel 27 of the series, adjacent to the first one; and so on until the twelfth peripheral channel 27. A return duct 29 connects a first end opposite to the second one, of the twelfth peripheral channel 27 of the series to the outer portion of the second circuit 14.

In a second alternative embodiment not shown, all peripheral channels 27 are mutually connected in a single series and the holding body 2 has a single delivery duct 28 and a single return duct 29.

The delivery 28 and return 29 ducts and the connecting ducts 30 are formed in the annular end bodies 12.

FIGS. 3a and 3b show a first annular end body 12 having two substantially radial passageways disposed in side by side relationship and defining the delivery ducts 28. The first annular end body 12 on a face thereof coupled to the central annular body 11 has tangential, grooves that, once said first annular end body 12 is coupled to the central annular body 11, define the connecting ducts 20. The first annular end body 12 has two further substantially radial passageways disposed in side by side relationship and defining the return ducts 29.

FIGS. 3a and 3b show a second annular end body 12 that on a face thereof coupled to the central annular body 11 has tangential grooves which, once said second annular end body 12 is coupled to the central annular body 11, define the connecting ducts 30.

As shown in FIGS. 3a and 3b, each of the second annular end bodies 12 interposed between two central annular bodies 11 in succession has the features both of the first and of the second annular end bodies 12 as above described.

Advantageously, bars, shown in FIG. 5, are adapted to reduce the passage section of the fluid so as to increase the fluid speed and the heat exchange therewith can be coaxially inserted into the peripheral channels 18 of the first circuit and/or the peripheral channels 27 belonging to the second circuits 14. To this aim, said bars have a smaller section than that of the respective peripheral channel 18, 27. For instance, the bars have a section area included between about 10% and 90% of the section area of channel 18, 27 in which they are inserted. Said bars can be located in the peripheral channels 18, 27 or in lengths of same where a more efficient local heat exchange is required to be achieved.

The first circuit for temperature adjustment 13 and/or each of the second circuits 14 further comprise (FIG. 6) pumps 31 and a like number of independent thermoregulation units 32 adapted to control and adjust the temperature of the heat-exchange fluid. These units 32 and pumps 31 are external to mandrel 3 and to the holding body 2 and belong to the outer portions of the first 13 and second 14 circuits, respectively.

Pumps 31 work at a constant pressure, preferably included between 3 bars and 12 bars and keep the flow inside the respective circuits 13, 14 constant.

FIG. 6 diagrammatically shows one of the second circuits 14 passing in the respective annular sector 10.

In addition to the above described portion (peripheral channels 27, delivery 28 and return 29 ducts and connecting ducts 30) passing in the annular sector 10, the second circuit 14 also comprises an outer portion connecting the return duct 29 to the delivery duct 28. This outer portion is acted upon by the thermoregulation unit 32 to cool and/or heat the heat-exchange fluid based on signals received from sensors directly or indirectly measuring one or more temperatures inside the portion of the annular chamber 4 concerned with sector 10. A similar scheme can be used for representing the first circuit 13 where, in place of the annular sector 10, there is mandrel 3 and the fluid passes through the central channel 15 and the peripheral channels 18.

Each of the thermoregulation units 32 works following the heat-exchange principles and preferably comprises a secondary cooling circuit 33 (with refrigerated water, for example) and a secondary heating circuit 34 (with steam or electric resistors, for example).

Alternatively, one thermoregulation unit 32 and one pump 31 can be provided for the second circuits 14 and one thermoregulation unit 32 and one pump 31 for the first circuit 13 or a single thermoregulation unit 31 and a single pump 32 for all said circuits 13, 14.

Through use of independent second circuits 14, the water temperature can be set in each of them based on the work regions of extruder 1. For instance, in the regions with strong mixing a lower water temperature will be preferably provided in order to obtain a more efficient heat exchange and take more heat away.

The invention claimed is:

1. A multiscrew extruder device for the production of elastomeric compounds comprising:
 a holding body;
 a mandrel inserted in the holding body and extending along a longitudinal axis, said mandrel and holding body delimiting an annular chamber therebetween;
 a plurality of extrusion screws disposed in the annular chamber and parallel to said longitudinal axis; and
 at least one first circuit for a heat-exchange fluid for temperature control inside said annular chamber, said first circuit being formed in the mandrel, wherein said first circuit comprises:
  a central channel extending within the mandrel along the longitudinal axis; and
  a plurality of parallel peripheral channels extending in a peripheral portion of the mandrel close to the annular chamber and in fluid communication with the central channel,
 wherein one end of at least one of the peripheral channels of the first circuit is in fluid communication with one end of another peripheral channel.

2. The device as claimed in claim 1, wherein the peripheral channels of the first circuit are parallel to the longitudinal axis.

3. The device as claimed in claim 1, wherein the peripheral channels of the first circuit are holes formed in the mandrel.

4. The device as claimed in claim 1, wherein each of the peripheral channels of the first circuit has a section diameter between 0.05 times and 0.4 times a maximum diameter of an extrusion screw.

5. The device as claimed in claim 1, wherein each of the peripheral channels of the first circuit has a minimum distance from the annular chamber greater than or equal to 5 mm.

6. The device as claimed in claim 1, wherein each of the peripheral channels of the first circuit has a minimum distance from an adjacent peripheral channel greater than or equal to 5 mm.

7. The device as claimed in claim 1, wherein one end of at least one of the peripheral channels of the first circuit is in fluid communication with the central channel.

8. The device as claimed in claim 1, wherein both opposite ends of each of the peripheral channels are in fluid communication with the central channel.

9. The device as claimed in claim 1, wherein the peripheral channels of the first circuit are organised into groups connected in parallel, the peripheral channels of each group being mutually connected in series, the first circuit having a delivery duct connecting the central channel to one end of the first peripheral channel of the group and a return duct connecting one end of the last peripheral channel of said group to the central channel.

10. The device as claimed in claim 9, wherein the peripheral channels of each group are adjacent.

11. The device as claimed in claim 1, wherein the peripheral channels of the first circuit are mutually connected in series, the first circuit having a delivery duct connecting the central channel to one end of the first peripheral channel and a return duct connecting one end of the last peripheral channel to the central channel.

12. The device as claimed in claim 1, wherein at least some of the peripheral channels have different lengths.

13. The device as claimed in claim 1, wherein the first circuit has delivery ducts and return ducts connecting the peripheral channels to the central channel, at least some of said delivery ducts being disposed at different points along the longitudinal axis.

14. The device as claimed in claim 1, wherein the first circuit has delivery ducts and return ducts connecting the peripheral channels to the central channel, at least some of said return ducts being disposed at different points along the longitudinal axis.

15. The device as claimed in claim 1, wherein the central channel comprises a radially internal portion in fluid communication through delivery ducts with the peripheral channels and a radially external portion in fluid communication through return ducts with said peripheral channels.

16. The device as claimed in claim 15, wherein the radially external portion of the central channel has a section diameter between 0.5 times and 1.2 times a maximum diameter of an extrusion screw.

17. The device as claimed in claim 15, wherein the radially internal portion of the central channel has a section diameter between 0.35 times and 0.85 times a maximum diameter of an extrusion screw.

18. The device as claimed in claim 1, comprising at least one second circuit for temperature control, formed in the holding body.

19. The device as claimed in claim 18, comprising a plurality of second circuits for temperature control, the plurality of second circuits being independent and axially aligned along the longitudinal axis.

20. The device as claimed in claim 19, comprising a plurality of independent thermoregulation units, each independent thermoregulation unit being coupled to one of the second circuits for temperature control.

21. The device as claimed in claim 18, wherein the second circuit for temperature control has a plurality of peripheral channels that are parallel and extend in a portion of the holding body close to the annular chamber.

22. The device as claimed in claim 21, wherein the peripheral channels of the second circuit for temperature control are parallel to the longitudinal axis.

23. The device as claimed in claim 21, wherein each of the peripheral channels of the second circuit has a section diameter between 0.05 times and 0.4 times a maximum diameter of an extrusion screw.

24. The device as claimed in claim 21, wherein each of the peripheral channels of the second circuit has a minimum distance from the annular chamber greater than or equal to 5 mm.

25. The device as claimed in claim 21, wherein each of the peripheral channels of the second circuit has a minimum distance from the adjacent peripheral channel greater than or equal to 5 mm.

26. The device as claimed in claim 18, comprising a thermoregulation unit coupled to the second circuit for temperature control.

27. The device as claimed in claim 26, wherein the thermoregulation unit is external to the holding body.

28. The device as claimed in claim 1, wherein the holding body comprises a plurality of sectors that are axially aligned along said longitudinal axis, each of said sectors having a second circuit for temperature control.

29. The device as claimed in claim 1, comprising a thermoregulation unit coupled to the first circuit for temperature control.

30. The device as claimed in claim 29, wherein the thermoregulation unit is external to the mandrel.

31. The device as claimed in claim 29, wherein the thermoregulation unit comprises a secondary cooling circuit.

32. The device as claimed in claim 29, wherein the thermoregulation unit comprises a secondary heating circuit.

33. The device as claimed in claim 1, further comprising bars capable of being inserted into the peripheral channels so as to reduce section thereof.

34. The device as claimed in claim 1, wherein, in a mandrel cross-section, the ratio between a sum of the area of the peripheral channels and the central channel and a section area of the mandrel is between 0.05 and 0.7.

35. The device as claimed in claim 1, wherein each of the extrusion screws has a maximum diameter between 30 mm and 150 mm.

36. A multiscrew extruder device for the production of elastomeric compounds comprising:
   a holding body;
   a mandrel inserted in the holding body and extending along a longitudinal axis, said mandrel and holding body delimiting an annular chamber therebetween;
   a plurality of extrusion screws disposed in the annular chamber and parallel o said longitudinal axis; and
   at least one first circuit for a heat-exchange fluid for temperature control inside said annular chamber, said first circuit being formed in the mandrel, wherein said first circuit comprises:
a central channel extending within the mandrel along the longitudinal axis; and
a plurality of parallel peripheral channels extending in a peripheral portion of the mandrel close to the annular chamber and in fluid communication with the central channel,
wherein one end of at least one of the peripheral channels of the first circuit is in fluid communication with the central channel.

37. The device as claimed in claim 36, wherein the peripheral channels of the first circuit are parallel to the longitudinal axis.

38. The device as claimed in claim 36, wherein the peripheral channels of the first circuit are holes formed in the mandrel.

39. The device as claimed in claim 36, wherein each of the peripheral channels of the first circuit has a section diameter between 0.05 times and 0.4 times a maximum diameter of an extrusion screw.

40. The device as claimed in claim 36, wherein each of the peripheral channels of the first circuit has a minimum distance from the annular chamber greater than or equal to 5 mm.

41. The device as claimed in claim 36, wherein each of the peripheral channels of the first circuit has a minimum distance from an adjacent peripheral channel greater than or equal to 5 mm.

42. The device as claimed in claim 36, wherein both opposite ends of each of the peripheral channels are in fluid communication with the central channel.

43. The device as claimed in claim 36, wherein the peripheral channels of the first circuit are organised into groups connected in parallel, the peripheral channels of each group being mutually connected in series, the first circuit having a delivery duct connecting the central channel to one end of the first peripheral channel of the group and a return duct connecting one end of the last peripheral channel of said group to the central channel.

44. The device as claimed in claim 36, wherein the peripheral channels of the first circuit are mutually connected in series, the first circuit having a delivery duct connecting the central channel to one end of the first peripheral channel and a return duct connecting one end of the last peripheral channel to the central channel.

45. The device as claimed in claim 36, wherein at least some of the peripheral channels have different lengths.

46. The device as claimed in claim 36, wherein the first circuit has delivery ducts and return ducts connecting the peripheral channels to the central channel, at least some of said delivery ducts or at least some of said return ducts being disposed at different points along the longitudinal axis.

47. The device as claimed in claim 36, wherein the central channel comprises a radially internal portion in fluid communication through delivery ducts with the peripheral channels and a radially external portion in fluid communication through return ducts with said peripheral channels.

48. The device as claimed in claim 47, wherein the radially external portion of the central channel has a section diameter between 0.5 times and 1.2 times a maximum diameter of an extrusion screw.

49. The device as claimed in claim 47, wherein the radially internal portion of the central channel has a section diameter between 0.35 times and 0.85 times a maximum diameter of an extrusion screw.

50. The device as claimed in claim 36, comprising a plurality of second circuits for temperature control, the plurality of second circuits being independent and axially aligned along the longitudinal axis.

51. The device as claimed in claim 36, wherein the holding body comprises a plurality of sectors that are axially aligned along said longitudinal axis, each of said sectors having a second circuit for temperature control.

52. The device as claimed in claim 36, comprising at least one second circuit for temperature control, formed in the holding body, wherein the second circuit for temperature control has a plurality of peripheral channels that are parallel and extend in a portion of the holding body close to the annular chamber.

53. The device as claimed in claim 52, wherein the peripheral channels of the second circuit for temperature control are parallel to the longitudinal axis.

54. The device as claimed in claim 36, comprising a thermoregulation unit coupled to the first circuit for temperature control.

55. The device as claimed in claim 54, wherein the thermoregulation unit is external to the mandrel.

56. The device as claimed in claim 54, wherein the thermoregulation unit comprises at least one among: a secondary cooling circuit and a secondary heating circuit.

57. The device as claimed in claim 36, comprising at least one second circuit for temperature control, formed in the holding body, and a thermoregulation unit coupled to the second circuit for temperature control.

58. The device as claimed in claim 57, comprising a plurality of independent thermoregulation units, each independent thermoregulation unit being coupled to one of the second circuits for temperature control.

59. The device as claimed in claim 57, wherein the thermoregulation unit is external to the holding body.

60. The device as claimed in claim 36, further comprising bars capable of being inserted into the peripheral channels so as to reduce section thereof.

61. The device as claimed in claim 36, wherein, in a mandrel cross-section, the ratio between a sum of the area of the peripheral channels and the central channel and a section area of the mandrel is between 0.05 and 0.7.

62. The device as claimed in claim 36, wherein each of the extrusion screws has a maximum diameter between 30 mm and 150 mm.

63. A multiscrew extruder device for the production of elastomeric compounds comprising:
a holding body;
a mandrel inserted in the holding body and extending along a longitudinal axis, said mandrel and holding body delimiting an annular chamber therebetween;
a plurality of extrusion screws disposed in the annular chamber and parallel o said longitudinal axis; and
at least one first circuit for a heat-exchange fluid for temperature control inside said annular chamber, said first circuit being formed in the mandrel,
wherein said first circuit comprises:
a central channel extending within the mandrel along the longitudinal axis; and
a plurality of parallel peripheral channels extending in a peripheral portion of the mandrel close to the annular chamber and in fluid communication with the central channel,
wherein at least some of the peripheral channels have different lengths.

64. The device as claimed in claim 63, wherein the peripheral channels of the first circuit are parallel to the longitudinal axis.

65. The device as claimed in claim 63, wherein the peripheral channels of the first circuit are holes formed in the mandrel.

66. The device as claimed in claim 63, wherein the first circuit has delivery ducts and return ducts connecting the peripheral channels to the central channel, at least some of said delivery ducts or at least some of said return ducts being disposed at different points along the longitudinal axis.

67. The device as claimed in claim 63, wherein the central channel comprises a radially internal portion in fluid communication through delivery ducts with the peripheral channels and a radially external portion in fluid communication through return ducts with said peripheral channels.

68. A multiscrew extruder device for the production of elastomeric compounds comprising:
a holding body;
a mandrel inserted in the holding body and extending along a longitudinal axis, said mandrel and holding body delimiting an annular chamber therebetween;
a plurality of extrusion screws disposed in the annular chamber and parallel to said longitudinal axis; and
at least one first circuit for a heat-exchange fluid for temperature control inside said annular chamber, said first circuit being formed in the mandrel,
wherein said first circuit comprises;
a central channel extending within the mandrel along the longitudinal axis; and
a plurality of parallel peripheral channels extending in a peripheral portion of the mandrel close to the annular chamber and in fluid communication with the central channel,
wherein the first circuit has delivery ducts and return ducts connecting the peripheral channels to the central channel, at least some of said delivery ducts or at least some of said return ducts being disposed at different points along the longitudinal axis.

69. A multiscrew extruder device for the production of elastomeric compounds comprising:
a holding body;
a mandrel inserted in the holding body and extending along a longitudinal axis, said mandrel and holding body delimiting an annular chamber therebetween;
a plurality of extrusion screws disposed in the annular chamber and parallel to said longitudinal axis; and
at least one first circuit for a heat-exchange fluid for temperature control inside said annular chamber, said first circuit being formed in the mandrel,
wherein said first circuit comprises:
a central channel extending within the mandrel along the longitudinal axis; and
a plurality of parallel peripheral channels extending in a peripheral portion of the mandrel close to the annular chamber and in fluid communication with the central channel,
wherein the central channel comprises a radially internal portion in fluid communication through delivery ducts with the peripheral channels and a radially external portion in fluid communication through return ducts with said peripheral channels.

70. The device as claimed in claim 69, wherein the radially external portion of the central channel has a section diameter between 0.5 times and 1.2 times a maximum diameter of an extrusion screw.

71. The device as claimed in claim 69, wherein the radially internal portion of the central channel has a section diameter between 0.35 times and 0.85 times a maximum diameter of an extrusion screw.

72. A multiscrew extruder device for the production of elastomeric compounds comprising:
a holding body;
a mandrel inserted in the holding body and extending along a longitudinal axis, said mandrel and holding body delimiting an annular chamber therebetween;
a plurality of extrusion screws disposed in the annular chamber and parallel o said longitudinal axis; and
at least one first circuit for a heat-exchange fluid for temperature control inside said annular chamber, said first circuit being formed in the mandrel,
wherein said first circuit comprises:
a central channel extending within the mandrel along the longitudinal axis; and
a plurality of parallel peripheral channels extending in a peripheral portion of the mandrel close to the annular chamber and in fluid communication with the central channel,
wherein the holding body comprises a plurality of sectors that are axially aligned along said longitudinal axis, each of said sectors having a second circuit for temperature control.

73. The device as claimed in claim 72, comprising a plurality of independent thermoregulation units, each independent thermoregulation unit being coupled to one of the second circuits for temperature control.

74. A multiscrew extruder device for the production of elastomeric compounds comprising:
a holding body;
a mandrel inserted in the holding body and extending along a longitudinal axis, said mandrel and holding body delimiting an annular chamber therebetween;
a plurality of extrusion screws disposed in the annular chamber and parallel to said longitudinal axis;
at least one first circuit for a heat-exchange fluid for temperature control inside said annular chamber, said first circuit being formed in the mandrel,
wherein said first circuit comprises:
a central channel extending within the mandrel along the longitudinal axis;
a plurality of parallel peripheral channels extending in a peripheral portion of the mandrel dose to the annular chamber and in fluid communication with the central channel; and
bars capable of being inserted into the peripheral channels so as to reduce section thereof.

* * * * *